United States Patent
Buschjohann et al.

(10) Patent No.: US 8,925,942 B2
(45) Date of Patent: *Jan. 6, 2015

(54) AXLE SUPPORT, IN PARTICULAR FRONT AXLE SUPPORT FOR MOTOR VEHICLES

(75) Inventors: Thomas Buschjohann, Nordstemmen (DE); Heiko Kauert, Bernau (DE)

(73) Assignee: KSM Castings Group GmbH, Hildesheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/823,227

(22) PCT Filed: Oct. 11, 2011

(86) PCT No.: PCT/DE2011/001832
§ 371 (c)(1),
(2), (4) Date: Mar. 14, 2013

(87) PCT Pub. No.: WO2012/059078
PCT Pub. Date: May 10, 2012

(65) Prior Publication Data
US 2013/0168939 A1 Jul. 4, 2013

(30) Foreign Application Priority Data

Nov. 2, 2010 (DE) .......................... 10 2010 050 006

(51) Int. Cl.
*B60G 7/00* (2006.01)
(52) U.S. Cl.
USPC ................................................. 280/124.109
(58) Field of Classification Search
USPC ....................... 280/124.109, 124.11, 787, 788
See application file for complete search history.

(56) References Cited

U.S. PATENT DOCUMENTS

| | | | |
|---|---|---|---|
| 4,453,740 A | 6/1984 | von der Ohe et al. | |
| 5,280,957 A | 1/1994 | Hentschel et al. | |
| 6,109,654 A * | 8/2000 | Yamamoto et al. | 280/784 |
| 6,511,096 B1 * | 1/2003 | Kunert et al. | 280/785 |
| 6,516,913 B1 | 2/2003 | Hartel et al. | |
| 6,623,020 B1 * | 9/2003 | Satou | 280/124.109 |
| 6,923,474 B2 | 8/2005 | Frasch et al. | |
| 7,520,514 B2 | 4/2009 | Ogawa et al. | |
| 7,584,815 B2 | 9/2009 | Ogawa et al. | |
| 8,083,244 B2 * | 12/2011 | Buschjohann et al. | 280/124.109 |
| 8,302,979 B2 * | 11/2012 | Buschjohann et al. | 280/124.109 |
| 8,333,395 B2 * | 12/2012 | Buschjohann et al. | 280/124.109 |

(Continued)

FOREIGN PATENT DOCUMENTS

| | | |
|---|---|---|
| DE | 20 2008 017 274 | 5/2009 |
| DE | 10 2009 031 961.1 | 7/2009 |

(Continued)

OTHER PUBLICATIONS

International Search Report of PCT/DE2011/001832, date of mailing Aug. 16, 2012.

(Continued)

*Primary Examiner* — Faye M. Fleming
(74) *Attorney, Agent, or Firm* — Collard & Roe, P.C.

(57) ABSTRACT

The invention relates to an axle support (12) for motor vehicles. The axle support comprises at least one receiving element (10) for the steering device, which preferably comprises a tubular hollow body (10a) and is either produced in a single piece with the axle support or is bonded thereto.

13 Claims, 3 Drawing Sheets

(56) References Cited

U.S. PATENT DOCUMENTS

Figure 1:
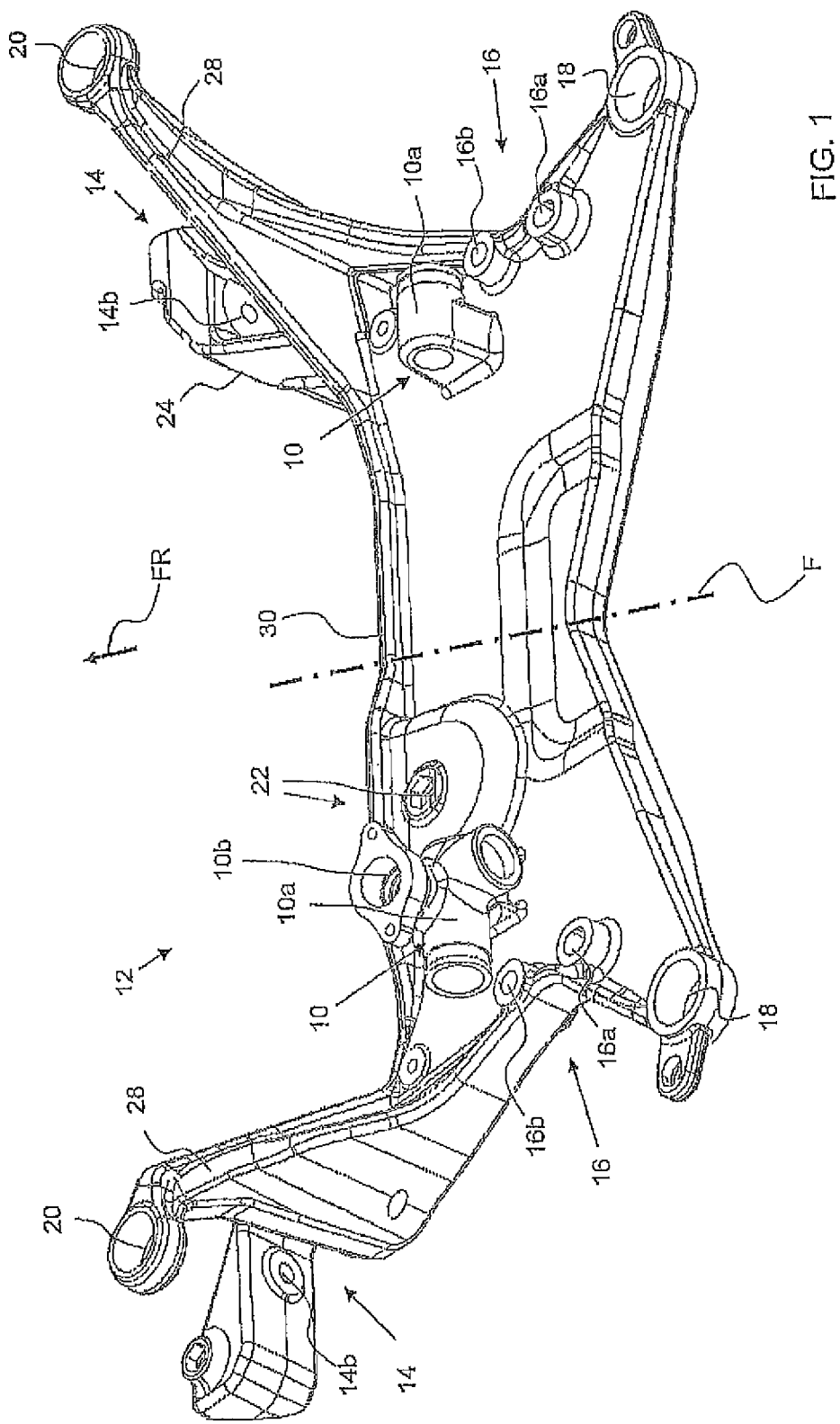

| | | | |
|---|---|---|---|
| 8,579,307 B2* | 11/2013 | Buschjohann et al. | 280/124.109 |
| 2005/0116434 A1 | 6/2005 | Kim et al. | |
| 2006/0091665 A1 | 5/2006 | Domin | |
| 2008/0315571 A1 | 12/2008 | Cariou et al. | |
| 2011/0193332 A1 | 8/2011 | Mildner et al. | |
| 2011/0215545 A1* | 9/2011 | Buschjohann et al. | 280/124.109 |
| 2012/0104739 A1 | 5/2012 | Buschjohann et al. | |
| 2012/0235397 A1 | 9/2012 | Kroger et al. | |
| 2013/0033017 A1* | 2/2013 | Buschjohann et al. | 280/124.109 |

FOREIGN PATENT DOCUMENTS

| | | |
|---|---|---|
| DE | 10 2009 035 590 | 7/2009 |
| DE | 10 2010 024 313.2 | 6/2010 |
| DE | 10 2010 025 555 | 1/2011 |
| DE | 10 2010 025 537 | 5/2011 |
| DE | 10 2010 003471 | 10/2011 |
| EP | 0 779 204 | 6/1997 |
| EP | 0 794 106 | 9/1997 |
| EP | 1 504 983 | 2/2005 |
| FR | 2 615 458 | 11/1988 |
| KR | 2007 0009121 | 1/2007 |
| KR | 2009 0112175 | 10/2009 |
| WO | WO 90/05083 | 5/1990 |
| WO | WO 2011/003387 | 1/2011 |

OTHER PUBLICATIONS

International Search Report of PCT/DE2010/000746, Oct. 15, 2010.
English translation of the International Preliminary Report on Patentability and Written Opinion of the International Searching Authority of PCT/DE2010/000746, Mailed Feb. 9, 2012.
Fahrenwaldt, Hans J./Schuler, Volkmar: Praxiswissen Schweiβtechnik [Practical Knowledge of Welding Technology], Berlin—Heidelberg, $2^{nd}$ revised and expanded edition, 2006, pp. 127-129. Spec, pp. 12-13, 34-35.

* cited by examiner

AXLE SUPPORT, IN PARTICULAR FRONT AXLE SUPPORT FOR MOTOR VEHICLES

CROSS REFERENCE TO RELATED APPLICATIONS

This application is the National Stage of PCT/DE2011/001832 filed on Oct. 11, 2011, which claims priority under 35 U.S.C. §119 of German Application No. 10 2010 050 006.2 filed on Nov. 2, 2010, the disclosure of which is incorporated by reference. The international application under PCT article 21(2) was not published in English.

The invention relates to an axle support, in particular front axle support for motor vehicles.

Such axle supports, which are also known as axle frames or subframes, integral frames or auxiliary frames among other designations, after they have been equipped with aggregates or auxiliary aggregates, are fixed as pre-mounted units or modules on vehicle superstructures, for example on the body and/or on longitudinal beams of a vehicle.

The task underlying the invention is to optimize an axle support cast in one piece with regard to at least individual ones of the functions or requirements named below. Thus the axle support should include as many as possible of the aggregates or auxiliary aggregates belonging to the chassis and drive, for example links, the steering device, the stabilizers or the drive aggregate, in order to ensure that such aggregates or auxiliary aggregates do not have to be fixed directly to the vehicle superstructure, especially because of requirements for mounting, body load, comfort and stiffness. Thus the axle support should include the links and resist wheel forces that occur.

Furthermore, it should include the steering mechanism and stabilizers. Spring or shock-absorber forces, tension and compression surges should also be resisted or absorbed by the axle support. Furthermore, the axle support should bear the drive aggregate. In addition, the axle support should offer high stiffness in transverse direction and increase the longitudinal elasticity in longitudinal direction. The axle support should enhance the elastokinematics and be constructed such that the mounting and maintenance as well as repair are facilitated. In addition, the axle support should enable an inexpensive manufacture of the kinematic linking points, known as hard points, with narrow tolerance. For this, the axle support should have an adequate strength at the linking points and withstand continuous loads. It should satisfy high requirements on stiffnesses, natural frequencies and crash behavior, be as lightweight as possible, be manufacturable inexpensively with as few individual parts as possible as well as with as few welds as possible, encompass as many chassis components as possible and enable adjustments thereof, occupy as little overall space as possible, damp the transmission of noise, especially road noise, and vibrations, especially wheel vibrations, and enable easy assembly and disassembly.

According to the invention, this is achieved by the fact that, in the axle support, which is preferably cast in one piece, at least one steering device receiving element or receiving element for the steering device is provided, which is manufactured completely or partly as well as in one piece with the axle support.

Such a steering device receiving element contained in the axle support enables the optimization of the axle support especially with regard to the comfort, safety and stiffness requirements imposed on an axle support.

By virtue of the at least one steering device receiving element manufactured in one piece completely or in parts with the axle support, an optimization for the resisting of wheel forces as well as of spring or shock-absorber forces as well as for the absorption of tension and compression surges may be achieved, depending on arrangement within the axle support. The at least one steering device receiving element manufactured in one piece completely or in parts with the axle support enables an optimization of the axle support geometry, so that an improvement of the transverse stiffness but also of the torsional stiffness of the axle support may be obtained. The requirements imposed on stiffnesses, natural frequencies and crash behavior of the axle support may be optimized in this way.

For specific service situations, it may be of advantage when at least one steering device receiving element is joined completely or partly as well as by material fusion with the axle support.

Such a steering device receiving element joined with the axle support likewise enables the optimization of the axle support geometry, especially with regard to the requirements of comfort, safety and stiffness imposed on an axle support.

Specifically, it has been shown on the one hand that, depending on arrangement within the axle support, such a separately manufactured steering device receiving element, integrated by material fusion in the axle support, which is preferably cast in one piece, can already resist wheel forces as well as absorb spring and shock-absorber forces, tension and compression surges. Thereby an axle support geometry may be created that leads to an improvement of the transverse stiffness but also torsional stiffness of the axle support. In addition, the requirements imposed according to the invention on stiffnesses, natural frequencies and crash behavior may be optimized or satisfied even better by means of the steering device receiving element joined by material fusion with the axle support, which is preferably cast in one piece.

A material-fusion joint is a joint in which the components, here especially axle support and steering device receiving element, are joined with one another so intimately that the forces occurring during the operation are transmitted by cohesion and adhesion. Such a joint is undetachable, i.e. it may be separated again only by destruction of the joined components or dismantled again into its components by destruction of the joining element.

It may be of advantage when two steering device receiving elements are provided in the axle support.

Preferably at least two steering device receiving elements transverse to the longitudinal direction of the vehicle are integrated in a manner spaced apart from one another in the axle support.

It may be expedient when one steering device receiving element has at least one tubular hollow body for the accommodation of a steering rod or toothed rack and/or track rod.

It may be expedient when a further steering device receiving element has at least one tubular hollow body for the accommodation of a steering rod or toothed rack and/or track rod.

It may be advantageous when a steering device receiving element is constructed for the bearing of a steering column.

It may be advantageous when one further steering device receiving element is constructed for the accommodation of the gearbox stages of a servo motor.

Despite the features according to the invention, the axle support may further be constructed relatively easily when substantially tubular hollow profiles, in which portions of a steering rod or toothed rack and/or of a track rod may be introduced in shiftable or axially movable manner, are used in the steering device receiving elements. Advantageously, even material may be saved by the steering device receiving element integrated in the axle support when the steering device receiving element makes an otherwise necessary transverse strut assembly or transverse housing within the axle support superfluous.

The axle support itself preferably has a basic body, which may be constructed in frame-like manner with stiffening struts or with an extensively closed basic face equipped only with the necessary recesses or receiving elements for the fixation/bearing of chassis components.

Steering devices that are components of the steering systems of ZF Lenksysteme GmbH, Schwäbisch GmUnd, Germany, known by the trade name ZF-Servoelectric®, have proved particularly suitable for integration in an axle support, especially by virtue of their geometry.

It may be expedient when a steering device receiving element is arranged substantially on the basic or axle body or above an imaginary horizontal plane spanned by the axle support. In the case of only one steering device receiving element with tubular hollow body for the accommodation of the steering rod or toothed rack, the latter is preferably oriented transverse to the longitudinal axis of the vehicle substantially over the width of the axle support. However, it may also be expedient when two steering device receiving elements with respectively tubular hollow bodies, which are arranged in a manner spaced apart from one another in the peripheral zone of the axle support, transverse to the longitudinal direction of the vehicle, in such a way that the steering rod has almost clear space at the middle, are provided for the accommodation of portions of the steering rod or toothed rack. In order to protect clear space at the middle of the steering rod or toothed rack from dirt, a cover, especially of plastic, preferably in the form of a bellows, may be advantageous. The two aforesaid steering device receiving elements with tubular hollow profiles arranged in the peripheral zone are preferably joined or equipped with receiving elements, namely on the one hand for the accommodation of a steering column and on the other hand for the accommodation of the angular gearbox of a servo motor.

Furthermore, it may be expedient when one steering device receiving element has a receiving element for the bearing of a steering column, wherein the receiving element preferably begins on the axle body or above an imaginary horizontal plane spanned by the axle support and ends under the axle body or under the imaginary horizontal plane spanned by the axle support. The receiving element has a passage for the tubular hollow body and is appropriately manufactured in one piece or joined by material fusion with the hollow body.

It may be of advantage when one steering device receiving element has a recess for the accommodation of the gearbox stages or of an angular gearbox of the servo motor, wherein the receiving element preferably begins under the axle body or under an imaginary horizontal plane spanned by the axle support and is accessible from there, as well as ends on the axle body or above the imaginary horizontal plane spanned by the axle support and is closed there. The receiving element has a passage for the tubular hollow body and is appropriately manufactured in one piece or joined by material fusion with the hollow body.

Furthermore, it may be of advantage when overall space for the servo motor plus ECU (Engine Control Unit) or control device is provided under the axle body or under an imaginary horizontal plane spanned by the axle support.

For various application situations, it may be advantageous when at least one steering device receiving element is only cast in place completely or in parts in and/or on the axle support. For further application situations, it may be advantageous when at least one steering device receiving element is additionally cast in place completely or in parts in and/or on the axle support.

For further service situations, it may be advantageous when at least one steering device receiving element is only over-cast completely or in parts in and/or on the axle support. For individual service situations, however, it may also be advantageous when at least one steering device receiving element is additionally over-cast completely or in parts in and/or on the axle support.

For various cases of use, it may also be advantageous when at least one steering device receiving element is only cast-on completely or in parts in and/or on the axle support. For individual cases of use, however, it may also be advantageous when at least one steering device receiving element is additionally cast-on completely or in parts in and/or on the axle support.

For further cases of use, it may also be advantageous when at least one steering device receiving element is only over-cast or cast in place completely or in parts in and/or on the axle support. For other cases of use, however, it may also be advantageous when at least one steering device receiving element is cast in place and cast-on completely or in parts in and/or on the axle support. For yet other cases of use, however, it may also be advantageous when at least one steering device receiving element is over-cast and cast-on completely or in parts in and/or on the axle support. Finally, for certain application situations, however, it may also be advantageous when at least one steering device receiving element is cast in place, over-cast and cast-on completely or in parts in and/or on the axle support.

Hereby virtually a monolithic component, which has strength values optimized in the zone of the at least one steering device receiving element, is obtained on the whole.

For specific service situations, it may be advantageous when at least one steering device receiving element is fixed completely or in parts in and/or on the axle support only by adhesive bonding. For certain application situations, it may be expedient when at least one steering device receiving element is fixed completely or in parts in and/or on the axle support additionally by adhesive bonding. For individual cases of use, it may be advantageous when at least one steering device receiving element is fixed completely or in parts in and/or on the axle support only by welding, especially by resistance spot welding. For specific application situations, it may be advantageous when at least one steering device receiving element is fixed completely or in parts in and/or on the axle support additionally by welding, especially by resistance spot welding. For certain service situations, it may be advantageous when at least one steering device receiving element is fixed completely or in parts in and/or on the axle support only by crimping of predetermined circumferential regions of the axle support. For further cases of use, it may be expedient when at least one steering device receiving element is fixed completely or in parts in and/or on the axle support additionally by crimping of predetermined circumferential regions of the axle support. For specific cases of use, it may be advantageous when at least one steering device receiving element is fixed completely or in parts in and/or on the axle support only by buttoning or especially clinching. For various application situations, it may be advantageous when at least one steering device receiving element is fixed completely or in parts in and/or on the axle support additionally by buttoning or especially clinching. Those skilled in the art may find a review of the buttoning or especially clinching in Fahrenwaldt, Hans J./Schuler, Volkmar: Praxiswissen Schweisstechnik [Practical Knowledge of Welding Engineering], Berlin—Heidelberg, 2nd Revised and Expanded Edition, 2008, pp. 127-129. For various service situations, it may be advantageous when at least one steering device receiving element is fixed completely or in parts in and/or on the axle support only by riveting. For various cases of use, it may be advantageous when at least one steering device receiving element is fixed completely or in parts in and/or on the axle support additionally by riveting. For further other service situations, it may be advantageous when at least one steering device receiving element is fixed completely or in parts in and/or on the axle support additionally by bolting.

Obviously the axle support cast in one piece is designed or provided for this purpose with a geometry in the zone of the at least one steering device receiving element to be accommodated in such a way that the selected joining method may be applied directly.

For the adhesive bonding, for example, it is practical when the portion of the axle support accommodating the at least one steering device receiving element is constructed as a cast hollow profile open on one side. Adhesive bonding has the advantage that the fixation of the at least one steering device receiving element in or on the axial support may be achieved relatively quickly.

An improvement of the invention provides that the axle support may be a front axle support or a rear axle support, while in a preferred construction this has respectively two receiving elements or recesses, spaced apart from one another in the longitudinal direction of the vehicle, for the bearing points for the swiveling bearing of each one of two wheel guide members, such as transverse or three-point links, and receiving elements for the fixation of the axle support as a prefabricated unit together with pre-mounted aggregates on the vehicle superstructure. Furthermore, it may be advantageous when the axle support cast in one piece has receiving elements or recesses preferably for the fixation of a stabilizer, for the bearing of a torque support or for the bearing of a pendulum support. These receiving elements or recesses may be joined with one another in one piece by the casting process.

Such a front axle support is suited particularly well for the integration of the at least one steering device receiving element.

For specific application situations, it may be expedient when the axle support is manufactured from steel.

On the whole, weight may be reduced with simultaneously higher loadability of the axle support when the axle support and/or at least one steering device receiving element is manufactured at least partly from a light metal or lightweight structural material. For specific application situations, a light metal may be advantageous as the lightweight material. For other application situations, a plastic may be advantageous as the lightweight material. For yet other application situations, a composite of light metal and plastic may be advantageous. In this way a more compact overall construction of an axle support according to the invention may be obtained. A hybrid solution, in which axle support and/or at least one steering device receiving element are constructed at least partly in one piece but in multiple substances or from different materials, may be advantageous.

The light metal may consist of aluminum, magnesium, zinc or alloys with one or more of these metals. For certain service purposes, one or more parts of the axle support may also consist advantageously of steel or iron, especially of steel or cast iron. For specific service purposes, a sheet-metal construction may be advantageous for one or more parts of the axle support.

It may be of advantage when the plastic is a polyamide, especially a glass-fiber-reinforced polyamide. However, a plastic of polypropylene, especially glass-fiber-reinforced polypropylene, may also be employed advantageously. For specific service purposes, it may be of advantage when a plastic known by the name Ultramid® A3WG10 CR is employed.

For further service situations, it may be advantageous when the axle support is cast in one piece. Furthermore, it may be advantageous when the axle support cast in one piece is manufactured in the pressure die-casting process or in the chill-mold casting process.

According to an improvement of the invention, at least one steering device receiving element consists completely or in parts of a light metal, preferably of aluminum, an aluminum, zinc or magnesium alloy, or of steel. An aluminum alloy has the advantage over steel that it is a light metal, and therefore has a lower weight than steel. In contrast, steel is distinguished by a higher modulus of elasticity, which is of advantage especially as regards a desired increase of the stiffness of an axle support. However, so-called hybrid aluminum may also be used advantageously for the manufacture of at least one steering device receiving element.

For specific service situations, it may be advantageous when at least one steering device receiving element is profiled completely or in parts for the increase of its stiffness, especially when it consists of one of the aforesaid light metals. For certain application situations, it may be advantageous when such a steering device receiving element is structured completely or in parts. For individual cases of use, however, it may also be expedient when such a steering device receiving element is profiled and structured completely or in parts.

For specific application situations, it may be advantageous when such a steering device receiving element has only at least one stiffening indentation. For certain service situations, it may be advantageous when such a steering device receiving element additionally has at least one stiffening indentation. Advantageously, the at least one stiffening indentation may be provided only on the inside of at least one steering device receiving element. For further service situations, it may be advantageous when the at least one stiffening indentation is provided additionally on the outside of at least one steering device receiving element. For various application situations, however, it may also be advantageous when the at least one stiffening indentation is provided only on the outside of at least one steering device receiving element.

For further cases of use, it may be advantageous when such a steering device receiving element has only at least one stiffening rib. For specific cases of use, however, it may also be advantageous when such a steering device receiving element additionally has at least one stiffening rib. Advantageously, the at least one stiffening rib may be provided only on the inside of at least one steering device receiving element. For specific service situations, it may be advantageous when the at least one stiffening rib is additionally provided on the outside of at least one steering device receiving element. For yet other application situations, however, it may also be advantageous when the at least one stiffening rib is provided only on the outside of at least one steering device receiving element.

For certain cases of use, it may be advantageous when such a steering device receiving element has only at least one stiffening bead. For individual cases of use, however, it may also be advantageous when such a steering device receiving element additionally has at least one stiffening bead. Advantageously, the at least one stiffening bead may be provided only on the inside of at least one steering device receiving element. For certain other service situations, it may be advantageous when the at least one stiffening bead is additionally provided on the outside of at least one steering device receiving element. For yet other application situations, however, it may also be advantageous when the at least one stiffening bead is provided only on the outside of at least one steering device receiving element.

For further application situations, it may be advantageous when such a steering device receiving element has only at least one stiffening bulge. For other application situations, it may be advantageous when such a steering device receiving element additionally has at least one stiffening bulge. Advantageously, the at least one stiffening bulge may be provided only on the inside of at least one steering device receiving element. For certain other service situations, it may be advantageous when the at least one stiffening bulge is additionally provided on the outside of at least one steering device receiving element. For yet other application situations, however, it may also be advantageous when the at least one stiffening bulge is provided only on the outside of at least one steering device receiving element.

It may be advantageous when the cast axle support is manufactured as the at least one steering device receiving element from a different material, preferably a different aluminum alloy, wherein the different materials, preferably different aluminum alloys, preferably differ in their melting points or alloys or alloy components.

In this connection it may be expedient when the wall thickness of at least one steering device receiving element is 0.5 to 4 mm, completely or in parts, and the diameter of at least one steering device receiving element is 10 to 50 mm, completely or in parts.

It may be advantageous when a part, cast in one piece together with the axle support, of at least one steering device receiving element is constructed at an open hollow profile.

Such an open hollow profile, in which a portion of the steering rod or toothed rack and/or track rod is shiftably arranged, has the advantage that the steering rod or toothed rack and/or track rod may be introduced in extremely mounting-friendly manner into it, if necessary besides other components. It may be of advantage when this hollow profile may then be closed with a suitable cover, especially in adhesively bonded manner. Preferably, redetachable joining techniques will be employed for the closure, so that the steering rod besides other components is rapidly accessible at any time for maintenance and/or repair jobs.

It may be of advantage when the axle support is constructed in roof-like manner, at least partly in the region of the steering rod.

Such a roof-like construction makes the axle support stiffer on the whole and offers adequate space for housing individual ones of the components necessary for the steering device, wherein these are protected under the roof-like construction. Such a roof open on one side, in which the steering rod or track rod is arranged shiftably, also has the advantage, however, that the steering rod or track rod may be introduced into it in extremely mounting-friendly manner, if necessary besides other components. It may be of advantage when this roof may then be closed from underneath with a suitable cover, especially in adhesively bonded manner. Preferably, redetachable joining techniques will be employed for the closure, so that the steering rod besides other components is rapidly accessible at any time for maintenance and/or repair jobs.

Especially for the improvement of the stiffness of the axle support, it may be expedient when the roof-like construction is provided in transverse direction of the axle support at least partly between the part of the at least one steering device receiving element for the accommodation of a steering column and the part of the at least one steering device receiving element for the accommodation of gearbox stages.

Especially for the improvement of the stiffness of the axle support, it may be advantageous when the roof-like construction has an inclined portion, which slopes downward beginning approximately above the receiving space provided for the steering rod and merges directly or indirectly into a transverse wall bounding the axle support, wherein the transverse wall is constructed preferably as a stiffening element with particularly thickened wall diameter and/or is equipped with at least one reinforcing rib. A rear transverse wall, especially that in travel direction, is preferred. It may be of advantage when the inclined portion has at least one especially weight-saving recess.

Especially for the improvement of the stiffness of the axle support, it may be of advantage when the roof-like construction has a substantially vertically oriented portion, which extends downward beginning approximately laterally beside the receiving space provided for the steering rod, then merges into an approximately horizontal to inclined portion and then into a transverse wall bounding the axle support, wherein the transverse wall is constructed preferably as a stiffening element with particularly thickened wall diameter and/or is equipped with at least one reinforcing rib. A front transverse wall, especially that in travel direction, is preferred. It may be of advantage when at least one portion has at least one especially weight-saving recess.

It may be further advantageous when the roof-like construction has a preferably rounded ridge, oriented in transverse direction approximately above the receiving space provided for the steering rod, which is constructed preferably as a stiffening element with particularly thickened wall diameter and/or is equipped with at least one reinforcing rib.

The invention further relates to a method for the manufacture of an axle support, with at least the following steps: deposition of at least one steering device receiving element as a whole or in parts into a predetermined position of a casting mold and then casting of the axle support with use of the casting mold.

Alternatively or additionally, a method for the manufacture of an axle support is provided, with at least the following steps: casting of the axle support and then joining of at least one steering device receiving element as a whole or in parts in a predetermined position in and/or on the axle support.

An improvement of the invention provides that the axle support is first solution-annealed after the casting, then at least one steering device receiving element is joined as a whole or in parts in and/or on the axle support, and finally the axle support together with at least one steering device receiving element is heat-treated.

It may be advantageous when, after the joining of at least one steering device receiving element as a whole or in parts in and/or on the axle support by adhesive bonding, the adhesive joint is coated, preferably equipped with a rubber layer or lacquered. Thereby the adhesive joint is protected, especially from external weather influences.

It may further be advantageous when the material-fusion joint is formed by adhesive bonding substantially over the entire length of at least one steering device receiving element.

It has proved particularly advantageous when the casting takes place using pressure in permanent molds. However, it may also be advantageous when the casting takes place using gravity in chill molds.

An improvement of the invention provides that, after integration of at least one steering device receiving element in the axle support, this together with at least one steering device receiving element is machined, and in particular necessary receiving elements or recesses are made.

Advantageous embodiments of the invention follow from Patent Applications DE 10 2009 031 961.1, DE 10 2010 025 555.6, DE 10 2009 035 590 and/or DE 10 2010 025 537.8, the disclosure substance or content of which is included or integrated by express reference as subject matter of the present application, pertinent to the present application.

It may be of advantage when at least one tube or manufactured hollow body functionally assisting the axle support and manufactured separately from the casting of the axle support is introduced in the axle support cast in one piece. For specific service situations, it may be of advantage when the tube is attached to the axle support cast in one piece. For certain application situations, it may be advantageous when the tube is introduced in the axle support cast in one piece and attached to the axle support cast in one piece. For further cases of use, it may be advantageous when the tube is fitted in the axle support cast in one piece. For certain service situations, it may be advantageous when the tube is introduced and fitted in the axle support cast in one piece. For specific service purposes, however, it may also be of advantage when the tube is attached to the axle support cast in one piece. Finally, however, it may also be of advantage for specific cases of use when the tube is introduced and fitted in the axle support cast in one piece as well as attached to the axle support cast in one piece.

Such a tube enables the optimization of the axle support, especially with regard to the comfort, safety and stiffness requirements imposed on an axle support.

Specifically, it has been shown that, depending on arrangement within the axle support, a tube manufactured separately and integrated in the axle support cast in one piece can resist wheel forces as well as absorb spring and shock-absorber forces, tension and compression surges. Especially a tube arranged in transverse direction in the axle support cast in one piece leads to a significant improvement of the transverse stiffness but also of the torsional stiffness. In addition, the requirements imposed according to the invention on stiffnesses, natural frequencies and crash behavior may be optimized or satisfied even better by means of the at least one tube integrated in the axle support cast in one piece.

In this way the axle support may be further constructed in relatively lightweight manner, since the tube is a hollow profile, wherein the hollow space advantageously may be used functionally.

In order to damp the transmission of noise, especially road noise, and vibrations, especially wheel vibrations, but also in order to reinforce the tube itself, the hollow space of the tube advantageously may be equipped with a damping material, preferably by foaming the hollow space with aluminum. So-called APM® Pearls (Advanced Pore Morphology Foam) are particularly suitable as damping material. By heat treatment, the metallic material introduced into the hollow space of the tube may be foamed to metallic foam beads, preferably of aluminum, of different size.

Besides the cited advantageous damping properties of a tube filled in particular with the aforesaid material, such a tube also exhibits an advantageous crash behavior.

Alternatively, the hollow space of the tube is expediently suitable for routing of existing cable strands, tube lines and/or cable pulls, which are then advantageously located in the tube in a manner protected from external influences.

However, the hollow space may also be used advantageously as an accumulator volume for compressed air, especially for the actuation of air springs.

An improvement of the invention provides that the axle support may be a front axle support or a rear axle support, while in a preferred construction this has respectively two receiving elements or recesses, spaced apart from one another in the longitudinal direction of the vehicle, for the bearing points for the swiveling bearing of each one of two wheel guide members, such as transverse or three-point links, and receiving elements for the fixation of the axle support as a prefabricated unit together with pre-mounted aggregates on the vehicle superstructure. Furthermore, it may be advantageous when the axle support cast in one piece has receiving elements or recesses preferably for the fixation of a stabilizer, for the bearing of a torque support, for the bearing of a pendulum support and/or for the fixation of the steering mechanism. These receiving elements or recesses may be joined with one another in one piece by the casting process.

Such a front axle support is suited particularly well for the integration or fitting-in of at least one tube.

For specific application situations, it may be expedient when the axle support is manufactured from steel.

For further service situations, it may be advantageous when the axle support cast in one piece is manufactured from a light metal, preferably from aluminum, an aluminum alloy or a magnesium alloy. Furthermore, it may be advantageous when the axle support cast in one piece is manufactured in the pressure die-casting process or in the chill-mold casting process.

For specific cases of use, it may be advantageous when the tube is introduced in the axle support by material fusion. A material-fusion joint is a joint in which the components, here especially axle support and tube, are joined with one another so intimately that the forces occurring during the operation are transmitted by cohesion and adhesion. For further application situations, it may be of advantage when the tube is attached to the axle support by material fusion. For further service cases, however, it may also be advantageous when the tube is introduced in the axle support by material fusion and attached to the axle support by material fusion. For specific cases of use, it may be further of advantage when the tube is introduced in the axle support by frictional coupling. For specific application situations, it may be expedient when the tube is attached to the axle support by frictional coupling. For yet other service situations, it may be advantageous when the tube is introduced in the axle support by frictional coupling and attached to the axle support by frictional coupling. For various cases of use, it may be advantageous when the tube is introduced in the axle support by material fusion and frictional coupling. For other cases of use, it may be advantageous when the tube is attached to the axle support by material fusion and frictional coupling. For specific service situations, it may be advantageous when the tube is introduced in the axle support by shape interlocking. For various application situations, it may be advantageous when the tube is attached to the axle support by shape interlocking. For yet other service situations, it may be advantageous when the tube is introduced in the axle support by shape interlocking and is attached to the axle support by shape interlocking. For various service situations, it may be advantageous when the tube is introduced in the axle support by material fusion and shape interlocking. For individual cases of use, it may be advantageous when the tube is attached to the axle support by material fusion and shape interlocking. For individual application situations, it may be advantageous when the tube is introduced in the axle support by frictional coupling and shape interlocking. For yet other application situations, it may be advantageous when the tube is attached to the axle support by frictional coupling and shape interlocking. For further individual cases of use, it may be advantageous when the tube is introduced in the axle support by material fusion, frictional coupling and shape interlocking. For various service applications, it may be advantageous when the tube is attached to the axle support by material fusion, frictional coupling and shape interlocking.

For various application situations, it may be advantageous when the tube is only cast in place at least partly in and/or on the axle support. For further application situations, it may be advantageous when the tube is additionally cast in place at least partly in and/or on the axle support.

For further service situations, it may be advantageous when the tube is only over-cast at least partly in and/or on the axle support. For individual service situations, however, it may also be advantageous when the tube is additionally over-cast at least partly in and/or on the axle support.

For various cases of use, it may also be advantageous when the tube is only cast-on at least partly in and/or on the axle support. For individual cases of use, however, it may also be advantageous when the tube is additionally cast-on at least partly in and/or on the axle support.

For further cases of use, it may also be advantageous when the tube is only over-cast and cast in place at least partly in and/or on the axle support. For other cases of use, however, it may also be advantageous when the tube is cast in place and cast-on at least partly in and/or on the axle support. For yet other cases of use, however, it may also be advantageous when the tube is over-cast and cast-on at least partly in and/or on the axle support. Finally, it may also be expedient for certain application situations, however, when the tube is cast in place, over-cast and cast-on at least partly in and/or on the axle support.

Hereby virtually a monolithic component, which has strength values optimized in the zone of the tube, is obtained on the whole.

For specific service situations, it may be advantageous when the tube is fixed at least partly in and/or on the axle support only by adhesive bonding. For certain application situations, it may be advantageous when the tube is fixed at least partly in and/or on the axle support additionally by adhesive bonding. For individual cases of use, it may be advantageous when the tube is fixed at least partly in and/or on the axle support only by welding, especially by resistance spot welding. For specific application situations, it may be advantageous when the tube is fixed at least partly in and/or on the axle support additionally by welding, especially by resistance spot welding. For certain service situations, it may be advantageous when the tube is fixed at least partly in and/or on the axle support only by crimping of predetermined circumferential regions of the axle support. For further cases of use, it may be expedient when the tube is fixed at least partly in and/or on the axle support additionally by crimping of predetermined circumferential regions of the axle support. For specific cases of use, it may be advantageous when the tube is fixed at least partly in and/or on the axle support only by the buttoning or especially clinching. For various application situations, it may be advantageous when the tube is fixed at least partly in and/or on the axle support additionally by buttoning or especially clinching. Those skilled in the art may find a review of buttoning or especially clinching in Fahrenwaldt, Hans J./Schuler, Volkmar: Praxiswissen Schweisstechnik [Practical Knowledge of Welding Engineering], Berlin—Heidelberg, 2nd Revised and Expanded Edition, 2008, pp. 127-129. For various service situations, it may be advantageous when the tube is fixed at least partly in and/or on the axle support only by riveting. For various cases of use, it may be advantageous when the tube is fixed at least partly in and/or on the axle support additionally by riveting. For further other application situations, it may be advantageous when the tube is fixed at least partly in and/or on the axle support only by bolting. For further other service situations, it may be advantageous when the tube is fixed at least partly in and/or on the axle support additionally by bolting.

Obviously the axle support cast in one piece is designed or provided for this purpose with a geometry in the zone of the tube to be accommodated in such a way that the selected fixing method may be applied directly.

For the adhesive bonding, for example, it is practical when the portion of the axle support accommodating the tube is constructed as a cast hollow profile open on one side. Adhesive bonding has the advantage that the fixation of the tube in or on the axial support may be achieved relatively quickly.

According to an improvement of the invention, the tube consists of a light metal, preferably of aluminum, an aluminum, zinc or magnesium alloy, or of steel. An aluminum alloy has the advantage over steel that it is a light metal, and therefore has a lower weight than steel. In contrast, steel is distinguished by a higher modulus of elasticity, which is of advantage especially as regards a desired increase of the stiffness of an axle support. However, so-called hybrid aluminum may also be used advantageously for the manufacture of the tube.

For specific service situations, it may be advantageous when the tube is profiled to increase its stiffness, especially when it consists of one of the aforesaid light metals. For certain application situations, it may be advantageous when such a tube is structured. For individual cases of use, however, it may also be advantageous when such a tube is profiled and structured.

For specific application situations, it may be advantageous when such a tube has only at least one stiffening indentation. For certain service situations, it may be advantageous when such a tube additionally has at least one stiffening indentation. Advantageously, the at least one stiffening indentation may be provided only on the inside of the tube. For further service situations, it may be advantageous when the at least one stiffening indentation is provided additionally on the outside of the tube. For various application situations, however, it may also be advantageous when the at least one stiffening indentation is provided only on the outside of the tube.

For further cases of use, it may be advantageous when such a tube has only at least one stiffening rib. For specific cases of use, however, it may also be advantageous when such a tube additionally has at least one stiffening rib. Advantageously, the at least one stiffening rib may be provided only on the inside of the tube. For certain service situations, it may be advantageous when the at least one stiffening rib is additionally provided on the outside of the tube. For yet other application situations, however, it may also be advantageous when the at least one stiffening rib is provided only on the outside of the tube.

For certain cases of use, it may be advantageous when such a tube has only at least one stiffening bead. For individual service situations, however, it may also be advantageous when such a tube additionally has at least one stiffening bead. Advantageously, the at least one stiffening bead may be provided only on the inside of the tube. For certain other service situations, it may be advantageous when the at least one stiffening bead is additionally provided on the outside of the tube. For yet other application situations, however, it may also be advantageous when the at least one stiffening bead is provided only on the outside of the tube.

For further application situations, it may be advantageous when such a tube has only at least one stiffening bulge. For individual application situations, it may be advantageous when such a tube additionally has at least one stiffening bulge. Advantageously, the at least one stiffening bulge may be provided only on the inside of the tube. For certain other service situations, it may be advantageous when the at least one stiffening bulge is additionally provided on the outside of the tube. For yet other application situations, however, it may also be advantageous when the at least one stiffening bulge is provided only on the outside of the tube.

It may be expedient when the cast axle support is manufactured as the at least one tube from a different material, preferably a different aluminum alloy, wherein the different materials, preferably different aluminum alloys, preferably differ in their melting points or alloys or alloy components.

In this connection it may be expedient when the wall thickness of the tube is 0.5 to 4 mm and the diameter of the tube is 10 to 50 mm.

The tube is preferably bent one or more times by means of a shaping method. A tube structure formed with internal high pressure (IHU) does not belong to the preferred alternative embodiments, since the IHU method is relatively cost-intensive.

Expediently, the tube has substantially an oval-shaped cross section.

It may be advantageous when the tube substantially follows the contour of a predetermined portion inside the axle support.

Expediently, where the tube crosses the predetermined receiving elements or recesses of the axle support cast in one piece, it is likewise equipped with corresponding receiving elements or recesses.

According to an improvement of the invention, the tube is oriented transverse to the longitudinal direction of the vehicle and preferably from one receiving element for the fixation of the axle support to the vehicle superstructure to the opposite receiving element for the fixation of the axle support to the vehicle superstructure, wherein the tube itself preferably contributes to forming these receiving elements, the receiving elements preferably being provided on cantilevers.

It may further be advantageous when the tube or a further tube is constructed substantially in U-shaped manner, wherein the portion joining the two free branches of the U-shaped tube is oriented transverse to the longitudinal direction of the vehicle and the free branches of the U-shaped tube are then oriented in the longitudinal direction of the vehicle and in the forward travel direction, wherein they preferably cross a tube extending if necessary transverse to the longitudinal direction of the vehicle and preferably from one receiving element for the fixation of the axle support to the vehicle superstructure to the opposite receiving element for the fixation of the axle support to the vehicle superstructure, in which case the free branches of the U-shaped tube preferably pass through the transversely oriented tube.

The invention further relates to a method for the manufacture of an axle support, with at least the following steps: deposition of at least one tube of predetermined contour into a predetermined position of a casting mold and then casting of the axle support with use of the casting mold.

Alternatively or additionally, a method for the manufacture of an axle support is provided, with at least the following steps: casting of the axle support and then fixation of the at least one tube of predetermined contour in a predetermined position in and/or on the axle support.

An improvement of the invention provides that the axle support is first solution-annealed after the casting, then the at least one tube is fixed in and/or on the axle support, preferably by circumferential crimping and finally the axle support together with tube is heat-treated.

It may be advantageous when, after the fixation of the at least one tube in and/or on the axle support by adhesive bonding, the adhesive joint is coated, preferably equipped with a rubber layer or lacquered. Thereby the adhesive joint is protected, especially from external weather influences.

It may further be advantageous when the fixation by adhesive bonding is applied substantially over the entire length of the at least one tube.

It has proved particularly advantageous when the casting takes place using pressure in permanent molds. However, it may also be advantageous when the casting takes place using gravity in chill molds.

An improvement of the invention provides that, after attachment and/or insertion of the at least one tube in the axle support, this together with tube is machined. In particular any overlengths of the tube that may be present are eliminated, and in particular necessary receiving elements or recesses are made.

The invention will be explained in the following on the basis of exemplary embodiments, which are illustrated in the drawing. In these FIG. 1 shows in plan view, obliquely from above, an axle support that is manufactured in one piece with two steering device receiving elements, FIG. 2 shows in plan view, obliquely from above, an axle support that is manufactured in one piece with two steering device receiving elements and some steering device components and FIG. 3 shows in plan view, obliquely from below, an axle support that is manufactured in one piece with two steering device receiving elements and some steering device components.

Figure 2:
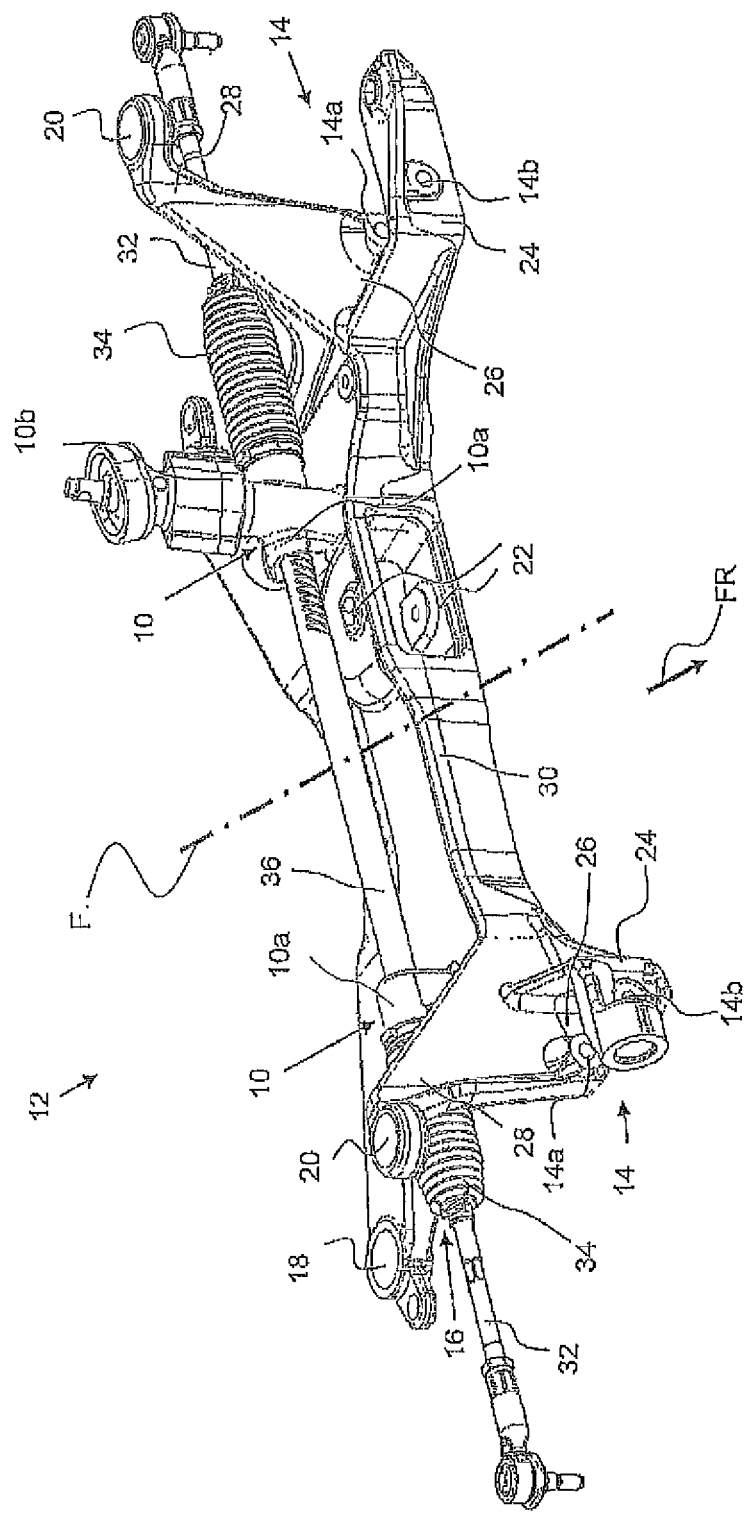
Figure 3:
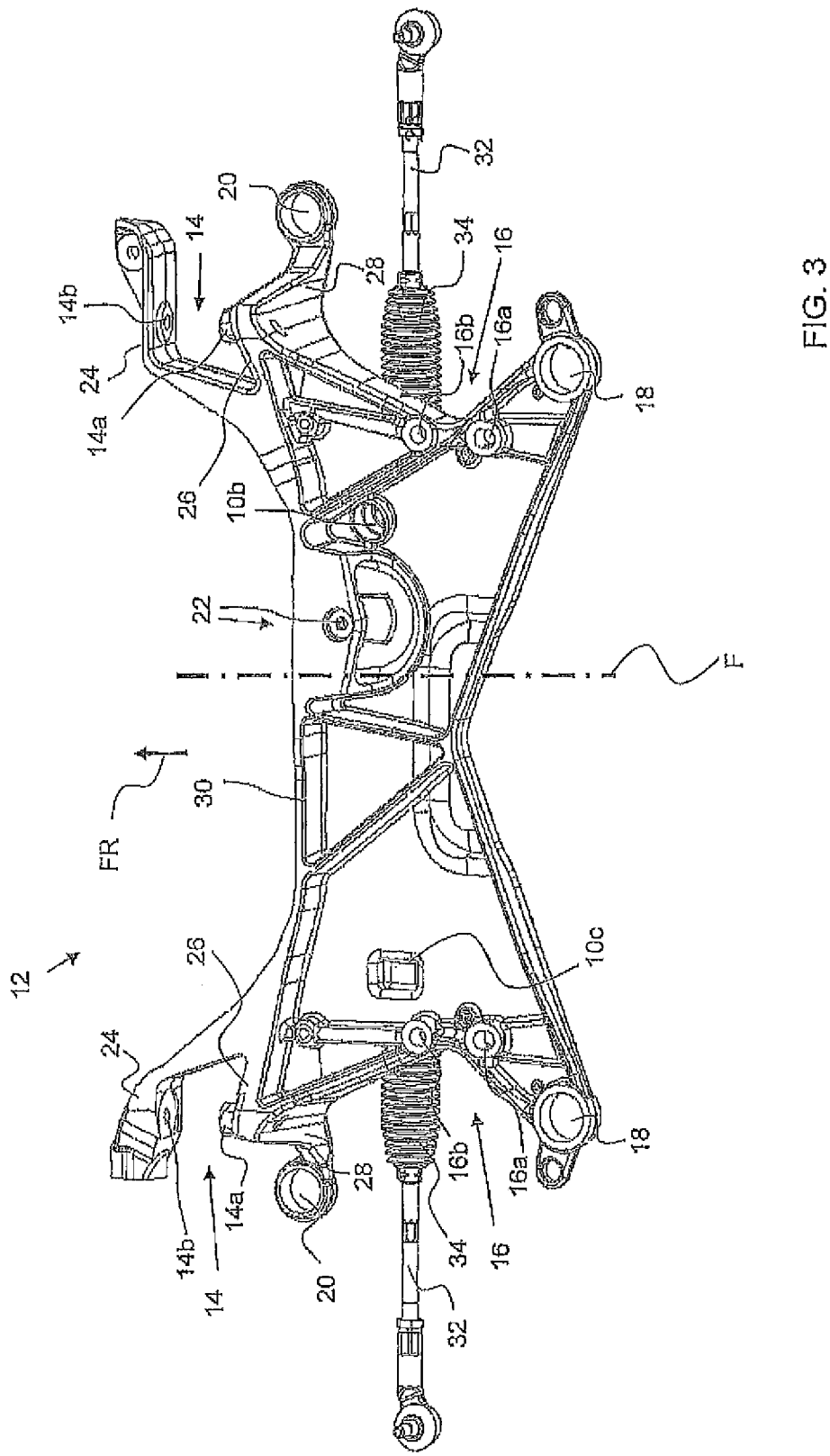

If like reference numerals are used in FIGS. 1 to 3, they denote like parts, so that for the purpose of avoidance of repetitions it is not necessary to discuss an already described component once again for the description of each figure. The items contained in the figures are represented as wireframe models.

The front axle support 12 for motor vehicles illustrated in FIGS. 1 to 3 possesses a basic body, preferably in the form of a frame, and comprises respectively two receiving elements 14, 16 spaced apart from one another in longitudinal direction F of the vehicle for the bearing points for the swiveling bearing of each of two transverse links, not illustrated here. In this connection, the receiving element 14 for the first bearing point of the transverse link not illustrated here is preferably formed by two cantilever receiving members 14a, 14b, which are provided in one cantilever 24, 26 each, which extends from the basic body. The receiving element 16 for the second bearing point of the transverse link not illustrated here is provided on the basic body and is formed by two fixation points 16a, 16b with transverse link clamps to be attached thereto but not illustrated here, wherein the receiving element 16 may also be formed by two cantilever receiving members, which may then be provided in one cantilever each extending from the basic body. The front axle support 12 also has a receiving element 22 for the bearing of a torque support, not illustrated here.

Furthermore, respectively two first receiving elements 18 and two second receiving elements 20 are provided for the fixation of the front axle support on the vehicle superstructure. The second receiving element 20 is integrated in a cantilever 28 extending from the basic body, and is preferably joined directly with the front receiving element 14 in travel direction FR for the bearing of the wheel guide members.

The receiving elements 14, 16, 18, 20, 22 are joined to one another in one piece by casting in the front axle support 12 according to the invention.

The front axle support 12 has in transverse direction a stiffening element 30, which joins the cantilever 28 and in which the receiving element 22 for the bearing of the torque support is arranged.

According to FIGS. 1 to 3, the front axle 12 has, according to the invention, two steering device receiving elements 10 spaced apart from one another, which are respectively manufactured in one piece with the front axle support 12. The steering device receiving elements 10 respectively comprise, arranged transverse to the longitudinal axis F of the vehicle, approximately centrally between the receiving elements 14, 16, a tubular hollow body 10a, in which a portion of the steering rod or toothed rack is arranged in axially movable or shiftable manner. The steering rod 36 is joined at its ends via articulations and track rods 32 with steerable wheels, not illustrated here. For protection of the articulations, a bellows 34 is arranged over each of those.

The steering device receiving elements 10 are advantageously provided for a toothed-rod electrical steering device, which has, besides the steering rod 36 and the track rods 32, a sensor, an ECU (Engine Control Unit), an electric servo motor and gearbox stages among others. These parts and their interaction are basically known.

In the present case, the first steering device receiving element 10 comprises, besides the tubular hollow body 10a, a receiving element 10b for the column worm or the steering column, which is driven by the steering wheel. At least one sensor, which upon a steering movement executed by the driver registers the corresponding steering torque and steering rate, is also arranged preferably in this receiving element 10b. These data are relayed as an electrical signal to the ECU or the control device, which calculates the necessary steering assistance and activates the servo motor on the basis of the calculated results.

The servo motor plus ECU or control device is preferably arranged on the underside of the front axle support 12, wherein its housings are advantageously integral parts of the axle support 12.

The servo motor transmits the optimal servo torque via a worm or recirculating ball mechanism to the toothed rack or toothed-rack electrical steering device.

Preferably the second steering device receiving element 10 comprises, besides the tubular hollow body 10a, a corresponding receiving element 10c for the worm or recirculating ball mechanism or angular gearbox of the servo motor.

This receiving element 10c may advantageously be accessible from underneath.

Correspondingly, the servo motor and preferably also the ECU are arranged on the underside of the front axle support 12.

FIGS. 1 to 3 show the front axle support according to the invention is already machined condition.

This condition is achieved by the fact that the front axle support 12 is machined in such a way after casting that all necessary receiving elements or recesses may be introduced, preferably those 14, 16 for the bearing parts for the swiveling bearing of each of two wheel guide members, those 18, 20 for the fixation of the axle support 12 as a prefabricated unit together with pre-mounted aggregates on the vehicle superstructure, that 22 for the bearing of a torque support, that 10b for the bearing of the steering column and that 10c for the accommodation of the angular gearbox of the servo motor.

By the steering device receiving element 10 manufactured in one piece with the front axle support 12, a simple and stable accommodation of the steering device in the axle support is achieved.

According to the invention, it is also possible that at least one steering device receiving element 10 or parts thereof, especially the tubular hollow body 10a, may be deposited in a predetermined position in a casting mold, preferably in a permanent mold of a pressure die-casting process. Thereupon the casting of the front axle support 12 cast in one piece takes place in such a way that the tubular hollow body 10a is cast in place or over-cast in the axle support 12.

The invention claimed is:

1. An axle support for motor vehicles, the axle support comprising at least two steering device receiving elements disposed transverse to the longitudinal direction of the vehicle and spaced apart from each other,
   wherein the axle support is cast in one piece.

2. The axle support according to claim 1, wherein at least one of the at least two steering device receiving elements has at least one tubular hollow body for the accommodation of a steering rod or toothed rack and/or track rod.

3. The axle support according to claim 1, wherein each of the at least two steering device receiving elements has at least one tubular hollow body for the accommodation of a steering rod or toothed rack and/or track rod.

4. The axle support according to claim 1, wherein at least one of the at least two steering device receiving elements is formed for the bearing of a steering column.

5. The axle support according to claim 1, wherein at least one of the at least two steering device receiving elements is formed for the accommodation of the gearbox stages of a servo motor.

6. The axle support according to claim 1, wherein the at least two steering device receiving elements are manufactured separately from the casting of the axle support and are cast in place and/or cast-on and/or over/cast on the axle support cast in one piece.

7. The axle support according to claim 1, wherein the axle support is a front axle support or a rear axle support,
   wherein the axle support has respectively two receiving elements or recesses, spaced apart from one another in the longitudinal direction of the vehicle, for the bearing points for the swiveling bearing of each one of two wheel guide members, and
   wherein the axle support has receiving elements or recesses for the fixation of the axle support.

8. The axle support according to claim 1, wherein the axle support or the at least two steering device receiving elements are manufactured at least partly from a lightweight material.

9. The axle support according to claim 8, wherein the lightweight material is a light metal, a plastic or a composite of light metal and plastic.

10. The axle support according to claim 9, wherein the lightweight material consists of aluminum, magnesium, zinc or alloys with one or more of these metals.

11. The axle support according to claim 9, wherein the plastic is a polyamide, especially a glass-fiber-reinforced polyamide.

12. Axle The axle support according to claim 1, wherein the axle support is manufactured in a light metal casting process.

13. The axle support according to claim 1, wherein the at least two steering device receiving elements have profilings and/or stiffening indentations, ribs, beads and/or bulges.

* * * * *